Figure 6:
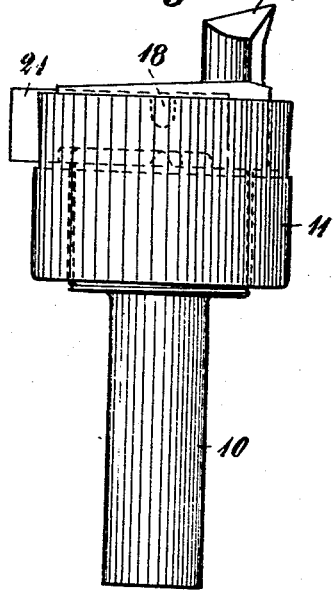

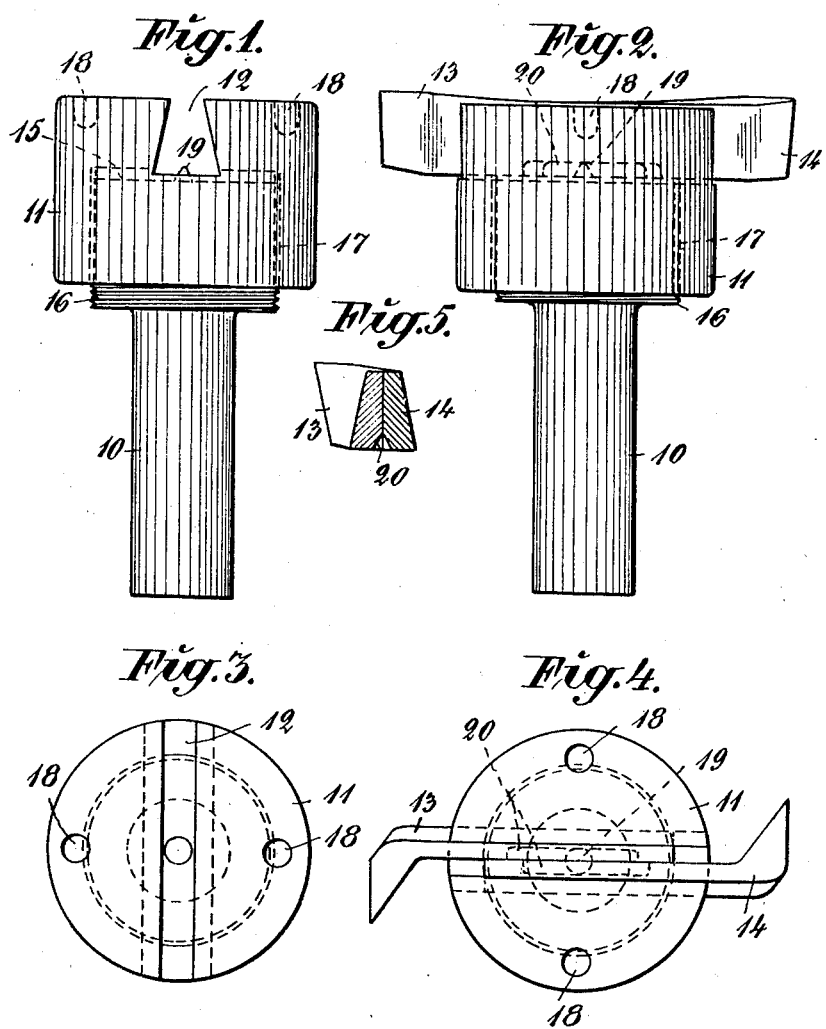

March 28, 1944.　　D. J. COUGHLIN　　2,345,462
CUTTING TOOL HOLDER
Filed Nov. 21, 1941　　2 Sheets-Sheet 2

Inventor,
Daniel Josef Coughlin
By: Henry C. Parker
Attorney.

Patented Mar. 28, 1944

2,345,462

UNITED STATES PATENT OFFICE 2,345,462

CUTTING TOOL HOLDER

Daniel Josef Coughlin, Uddevalla, Sweden

Application November 21, 1941, Serial No. 420,025
In Sweden November 29, 1940

9 Claims. (Cl. 279—9)

The present invention relates to cutting tool holders for milling machines, and more particularly to such cutting tool holders as are used in wood working machinery for cutting slots, mortices and tenons in wooden parts that are to be jointed together and which consist of a shank adapted to be secured in the milling machine and of a head supported at the end of the shank and provided in the end surface remote from the shank with a diametrical fixing slot for the radially adjustable cutters. Previously known cutting tool holders of the kind set forth have the inconvenience that, due to an unsatisfactory securing of the cutters in the fixing slot, the cutters have a tendency to get into disturbing audible vibrations and, furthermore, are liable to work loose and to be flung out into the room under the action of the centrifugal force.

It is an object of the present invention to secure, in tool holders of the kind set forth, such a rigid fastening of the cutters in the fixing slot that no disturbing vibrations are produced while at the same time every risk of the cutters of working loose and being flung out into the room is avoided.

A cutting tool holder according to the invention which meets said requirements is substantially characterized in that the transverse fixing slot for the cutters is dovetailed and is intended to receive shank portions of the cutters formed in a corresponding manner as wedges, and that the shank of the tool holder is screwed with a threaded portion into an axial bore in the head provided with internal threads and is in other respects so arranged that on being screwed into the head it will press against the wedge-shaped shank portions of the cutters and clamp said portions securely in the slot in the desired adjusting positions of the cutters.

In a preferred embodiment of the tool holder according to the invention the threaded end of the shank of the tool holder is made with a considerably larger diameter than the end intended to be secured in the milling machine, in order to increase the end surface with which the tool holder shank engages with the shank portions of the cutters, and also in order to decrease the stresses on the threads during working of the cutters, particularly in hard wood. It should be particularly noted that by selecting threads of such a direction that the forces of reaction which act on the cutters will strive to screw the shank further into the head, the particular advantage is gained that the fixing arrangement for the cutters will become self-locking.

In order to avoid every risk for accidents occurring on account of the cutters working loose during operation, it is suitable to provide the tool holder with a positively acting locking arrangement, consisting of a raised portion on the engaging end of the tool holder shank which on the screwing of the shank into the head enters into a corresponding longitudinal slot in the shank portions of the cutters. Suitably the raised portion is made in the form of a centrally arranged pin, preferably of conical shape. Said latter construction may be used to particular advantage in such cutting tool holders according to the invention, in which two cutting tools are secured in the fixing slot with their shank portions side by side, so that in their working positions their shank portions form together a wedge which fits closely into the dovetailed slot. In said case the necessary locking slot in the cutters may be obtained simply by chamfering the adjacent lower corner edges of the shank portions of the cutters on a certain part of their length in conformity with the shape of the locking pin.

Figure 8:
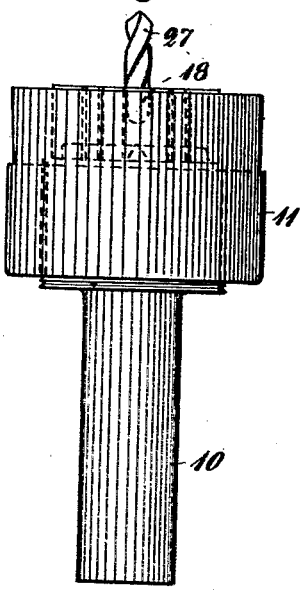
Figure 7:
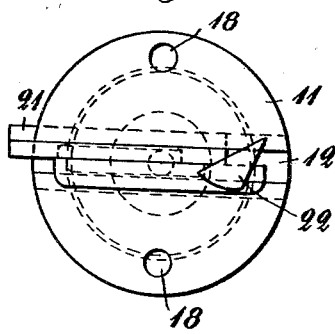
Figure 9:
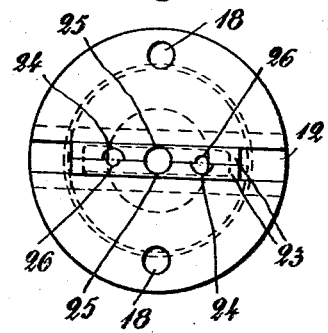

The invention will now be described more in detail having reference to the attached drawings, in which Figures 1 and 2 show an embodiment of the cutting tool holder in two side views which are perpendicular to each other, Figure 1 showing the holder without cutters and Figure 2 the holder with two cutters inserted in working position, Figure 3 is a top view without cutting tools and Figure 4 a top view with cutting tools, Figure 5 is a cross section through the shank portions of the cutters, Figures 6 and 7 show the cutting tool holder in side view and in top view with only one cutting tool secured in the holder in working position, and Figures 8 and 9 show, also in side view and top view, the use of the tool holder as a drill chuck.

Referring now to the drawings, 10 designates the shank of the cutting tool holder intended to be secured in the milling machine, 11 the head of the tool holder, and 12 the diametrically extending dovetailed fixing slot for the two cutting tools 13 and 14, which are displaceable along the slot and are positioned in the slot with their shank portions side by side. As will be clear, particularly from Figure 5, the shank portions of the cutting tools form together a wedge which fits accurately into the dovetailed fixing slot 12, said shank portions being furthermore provided with plane lower surfaces which, when the cutting tools take up their working positions in the slot, are perpendicular to the axis of rotation and parallel with the end surface of the head. The plane lower surfaces of the cutting tool shanks are intended to be engaged by the shank 10 which with a threaded portion 16 of increased diameter is screwed into a threaded axial bore 17 in the head 11. As is clearly seen on the drawings, said bore reaches a certain distance into the transversal fixing slot 12, so that on screwing the shank 10 into the bore the plane end surface 15 of the shank will press against the lower surfaces of the shank portions of the two cutters 13 and 14, securely wedging the shank portions into the dovetailed fixing slot in the desired positions of the tools. The fixing arrangement for the cutting tools now described is self-locking, in that the direction of the threads on the shank 10 and in the bore 17 is so selected that the reaction forces which act on the cutting tools strive to screw the shank further into the bore.

In order to facilitate the screwing of the shank 10 into the bore in the head 11 to fasten the cutters, the head is provided with two holes 18 for a detachable key, not shown.

To prevent the cutting tools 13 and 14 from being flung out into the room under the action of the centrifugal force in case the cutters should work loose in the fixing slot 12, the cutting tool holder shown is provided with a safety device consisting of a centrally arranged projection in the form of a conically shaped pin 19 which is made integral with the tool holder shank 10 and which on the screwing of the shank into the head enters into a longitudinal locking slot 20 in the cutters. Said slot has been formed by chamfering the shank portions of the cutters along part of their length at their adjacent lower corner edges in accordance with the shape of the pin 19. Should for some reason the cutting tools 13 and 14 work loose, the end shoulders of the slot will engage with the pin 19 and effectively prevent a further movement of the cutters in a radial direction.

Figures 6 and 7 show how it is possible to secure in the fixing slot 12 a single cutting tool 22 by using a filler 21 which has the same shape in cross section as the shank portion of the cutting tool, and to maintain at the same time the dynamic balancing of the tool holder.

Figures 8 and 9 illustrate the use of the cutting tool holder according to the invention as a drill chuck for drills of different diameters. In the fixing slot 12 of the head there are inserted, instead of two cutting tools, two gripping jaws 23 of trapezoidal cross sectional shape, said gripping jaws being provided in their opposite side surfaces with semi-circular recesses 24, 25 and 26 which may be positioned in pairs opposite each other coaxially with the axis of rotation of the head 11, said recesses serving to securely grip a drill 27 between their surfaces on the screwing of the tool holder shank 10 into the head.

The invention is, of course, not limited to the embodiment illustrated and described, but various modifications may be effected therein without receding from the idea of the invention. Particularly the invention comprises all equivalent arrangements.

What is claimed is:

1. A cutting tool holder for milling machines, such as those used for wood working, which comprises in combination a shank having an end adapted to be secured in the milling machine and a threaded end, a tool-holding head having an axial threaded bore adapted to receive the threaded end of said shank, said head being provided with a transverse slot of dovetail shape communicating with said threaded bore and being adapted to receive the shank portions of two cutting tools said shank portions being of wedge shape and when placed together in operating position having a contour corresponding to the shape of said dovetail, the threaded end of said shank being adapted to press against the shank portions of said cutting tools thereby producing a wedging action serving to secure said cutting tools firmly in said head.

2. The cutting tool holder of claim 1 in which the threads on said shank and said tool-holding head run in such direction with respect to the rotation of said holder that the reaction of the cutters tends to screw the shank further into said head thereby increasing said wedging action.

3. The cutting tool holder of claim 1 wherein the face at the threaded end of said shank is planar and perpendicular to the axis of said threaded bore and is adapted to bear against planar surfaces on the shank portions of said cutting tools.

4. The cutting tool holder of claim 1 wherein the threaded end of said shank is substantially larger in diameter than the end adapted to be secured in said milling machine.

5. The cutting tool holder of claim 1 wherein the face at the threaded end of said shank is provided with a pin-shaped projection and the shank portions of said tools are provided with cooperating recesses adapted to receive said projection when said tools are clamped in operating position, said recesses extending over a portion only of the length of said shanks leaving shoulders at each end in such manner as to prevent said tools from being thrown out of said head by centrifugal force even though loose in said slot.

6. The cutting tool holder of claim 1 wherein the face at the threaded end of said shank is provided with a raised conically shaped pin and the shank portions of said tools are chamfered along a portion only of their adjacent edges, thereby forming a groove with shoulders at the ends adapted to receive said conical pin in such manner as to prevent said tools from being thrown out of said head by centrifugal force even though loose in said slot.

7. As novel articles of manufacture, cutting tools adapted to be used in pairs comprising cooperating shank portions in the shape of wedges which when placed together in operating position are dovetailed in cross section, said shank portions being adapted to fit in pairs into a correspondingly dovetailed slot in the tool-holding head of a milling machine and to be held in place by pressure applied against them in such manner as to produce a wedging action forcing them against the sides of said dovetailed slot.

8. As novel articles of manufacture, cutting tools adapted to be used in pairs comprising cooperating shank portions in the shape of wedges which when placed together in operating position have a cross section in the shape of a dovetail with two parallel faces of different width, the wider of said faces being planar, said shank portions being adapted to fit in pairs into a correspondingly dovetailed slot in the tool-holding head of a milling machine and to be held in place by pressure applied against said planar face in such manner as to produce a wedging action forcing said shank portions against the sides of said slot.

9. The cutting tools of claim 8 wherein said shank portions are chamfered for a portion only of their length along their adjacent edges forming a recess with end shoulders in said planar face and wherein a locking pin is provided in said tool-holding head to fit into said recess thereby preventing said tools from being thrown out of said slot by centrifugal force even when loose in said slot.

DANIEL JOSEF COUGHLIN.